United States Patent
Blum et al.

(10) Patent No.: US 6,288,146 B1
(45) Date of Patent: *Sep. 11, 2001

(54) LOW-EMISSION BINDERS FOR COATINGS

(75) Inventors: Rainer Blum, Ludwigshafen; Thomas Loerzer, Landau, both of (DE)

(73) Assignee: Basf Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,846
(22) PCT Filed: Dec. 30, 1996
(86) PCT No.: PCT/EP96/05861
  § 371 Date: Oct. 26, 1998
  § 102(e) Date: Oct. 26, 1998
(87) PCT Pub. No.: WO97/25387
  PCT Pub. Date: Jul. 17, 1997

(30) Foreign Application Priority Data

Jan. 4, 1996 (DE) ................................ 196 00 152

(51) Int. Cl.$^7$ .............................. C08L 67/06; C08F 2/46; C08G 63/02
(52) U.S. Cl. ............................ 523/500; 528/298; 525/43; 522/107
(58) Field of Search ............................... 523/500; 525/43; 522/104; 528/298; 526/318.25; 427/553, 385.5

(56) References Cited

U.S. PATENT DOCUMENTS

| | | | |
|---|---|---|---|
| 3,715,330 | * 2/1973 | Nogami et al. | 523/512 |
| 4,072,642 | * 2/1978 | Ritz et al. | 525/49 |
| 4,224,430 | 9/1980 | Maekawa et al. | |
| 4,246,367 | * 1/1981 | Curtis, Jr. | 525/43 |
| 4,801,629 | * 1/1989 | Stavinoha et al. | 523/500 |

FOREIGN PATENT DOCUMENTS

| | | |
|---|---|---|
| 31 07 450 | 10/1982 | (DE). |
| 0 101 585 | 2/1984 | (EP). |
| 0 186 165 | * 7/1986 | (EP). |
| 0 275 034 | 7/1988 | (EP). |
| 0275034 | * 7/1988 | (EP). |
| 0 684 284 | 11/1995 | (EP). |
| 6133318 | * 10/1981 | (JP). |

* cited by examiner

Primary Examiner—Tae H. Yoon
(74) Attorney, Agent, or Firm—Oblon, Spivak, McClelland, Maier & Neustadt, P.C.

(57) ABSTRACT

The invention concerns the use of monomer-free, saturated and unsaturated polyester resins, or mixtures of saturated and unsaturated polyester resins, containing structural units of the general formulae (I) and/or (II), in which n =1–10, as low-emission binders for coatings.

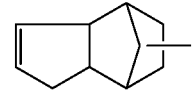

(I)

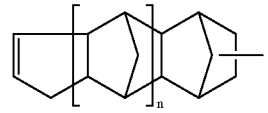

(II)

n = 1–10.

12 Claims, No Drawings

LOW-EMISSION BINDERS FOR COATINGS

The present invention relates to the use of specific polyester resins as solvent-free and monomer-free binders for coatings. They are suitable for producing pigmented and unpigmented coating materials and other coatings for metals and nonmetals. Their curing, ie. the transition from the liquid to the solid state in which they are used, takes place by a mechanism which does not give rise to emissions.

Numerous publications relate to unsaturated polyester resins containing dihydrodicyclopentadiene (=DCPD) structural units as a constituent of customary UP resin systems, ie. dissolved in monomeric reactive diluents, generally dissolved in styrene. Masses which can be processed in liquid form, possibly after heating, are stable on storage at processing temperature and whose viscosity is established by way of the novel "DCPD-polyfunctional compounds" without customary monomer reactive diluents containing acrylic or vinylic unsaturation, however, have not hitherto been disclosed.

DE-A-27 08 846 refers to the possibility of reducing styrene in customary UP resin systems by using specific DCPD-containing polyesters.

DE-A-31 07 450 relates to unsaturated polyesters having oligomers of cyclopentadiene as end groups, which can be used as solutions in ethylenically unsaturated monomers to produce moldings and coatings.

EP-A-0 684 284 describes synergistic mixtures of unsaturated polyether ester resins and dicyclopentadiene polyester resins which are dissolved in styrene and are cured in the presence of peroxidic catalysts.

EP-A-0 101 585 relates to unsaturated polyester resins which are modified by the addition of cyclopentadiene onto the double bond of the polyester and are then dissolved in vinyl monomers. However, none of these documents discloses substances which can be processed in liquid form at room temperature or after heating with the use of the novel DCPD-polyfunctional compounds, without the use of monomeric reactive diluents containing acrylic or vinylic unsaturation, as low-emission binders for combined curing by UV light and heat.

To produce low-emission coating compositions for metals and other substrates, powder coatings, aqueous coating systems and liquid, (UV-)radiation-curable coatings are known. Disadvantages, in aqueous systems among others, include the need to evaporate the water, and the effect of the water on the substrates. A known problem in the case of powder coatings is the discrepancy between the requirement for good storage stability of the powders (blocking resistance) and good flow on melting. Liquid (UV-) radiation-curable coatings are systems in which the entire mass of the coating material remains in the finished coating (100% systems), and have good flow and good film properties. Disadvantages include the surface inhibition of the crosslinking reaction by atmospheric oxygen, and the high degree of shrinkage on curing, which in general impairs adhesion. Further disadvantages of known UV systems relate to the often health-damaging potential of the olefinically unsaturated organic compounds used (reactive diluents), such as styrene, vinyltoluene, allyl phthalate and the monomeric or oligomeric acrylic or vinyl esters, both in the course of processing and in the finished coatings, where residual monomers remain.

It is an object of the present invention to avoid the abovementioned disadvantages.

We have found that this object is achieved and these problems are solved by the use of saturated or unsaturated polyesters which can be processed in liquid form at room temperature or after moderate heating, without the addition of solvent, which have structural units according to formulae (I) and/or (II) and which meet the conditions defined below with regard to the melting and viscosity ranges. According to the present invention these ranges can surprisingly be established by the use of the poly-DCPD compounds without the use of monomeric reactive diluents containing vinylic unsaturation.

The possibility of curing saturated polyesters containing structural units of the formulae (I) and (II) using free-radical donors, thermally or by radiation, preferably UV rays, or, with particular preference, by combined curing with radiation and heat, was not hitherto known.

The present invention provides the use of monomer-free, saturated and unsaturated polyester resins or mixtures of saturated and unsaturated polyester resins comprising structural units of the general formulae (I) and/or (II)

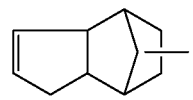
(I)

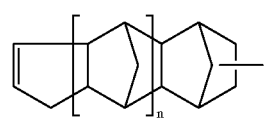
(II)

n = 1 to 10 as low-emission binders for coatings.

The structural units of the formulae (I) and/or (II) can be incorporated in the form of esters of dihydrodicyclopentadienol with monomeric or polymeric carboxylic acids comprising groups of the formula (III) and/or in the form of esters of oligodihydrodicyclopentadienol with monomeric or polymeric carboxylic acids comprising groups of the formula (IV)

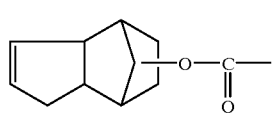
(III)

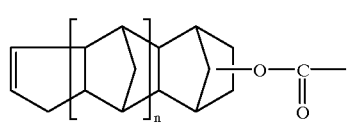
(IV)

n = 1 to 10.

The binders can be monomer-free unsaturated polyester resins comprising structural units of the general formulae (I) and/or (II), or unsaturated polyesters comprising structural units of the formulae (I) and/or (II) can also be used, in addition, if saturated polyester resins are employed.

The structural units of the formulae (I) and/or (II) can be introduced in particular by the use of compounds of the formulae (V) and (VI), ie. the dihydrodicyclopentadienol monoesters of maleic acid and fumaric acid and the monoesters of maleic acid and fumaric acid with oligomeric dihydrodicyclopentadienol

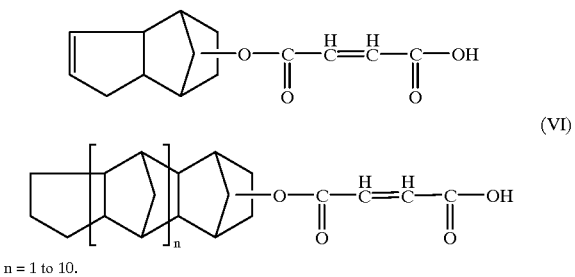

n = 1 to 10.

The polyesters to be used in accordance with the invention can be synthesized with the use of alcohols and polyols which are ethoxylated or propoxylated, with the use of mono- or polyhydric alcohols of the polyesterpolyol type, for example polycaprolactone, or with the use of mono- or polyhydric alcohols of the polyetherpolyol type, such as polyethylene oxide, lo polypropylene oxide and/or polytetrahydrofuran.

Moreover, ethylenically unsaturated units can be used additionally when synthesizing the polyester resins, these units including in particular maleic acid and fumaric acid.

A further advantageous embodiment of the novel use is that wherein the binders comprise chemically bonded photoinitiators containing xanthone, thioxanthone and/or phenone structures, preferably those comprising, as chemically bonded photoinitiator, hydroxybenzophenone or benzophenonetetracarboxylic acid incorporated into the polyesters by condensation.

The coatings can be cured by stoving at between 80 and 300° C. or with peroxides, with or without reaction-accelerating co-initiators, such as heavy metal salts and/or C-C-labile compounds, at room temperature or at elevated temperature, if appropriate up to a partially cured B stage, and can then be cured fully at a later point in time.

A further advantage is that the binders can be cured with actinic radiation, preferably UV radiation, the photoinitiators required either being present in chemically bonded form in the binder or having been added to the binder, or both chemically bonded and added photoinitiators can be used.

Similarly, curing with actinic radiation can be combined with curing with peroxides or C-C-labile substances or with purely thermal curing.

A particularly advantageous embodiment consists in the use of binders comprising esterification products of the formulae (V) and (VI) with monofunctional alcohols and/or polyfunctional alcohols and/or the alkoxylation products thereof and/or polyetherpolyols and/or polyesterpolyols such as polyethylene oxide, polypropylene oxide, polytetrahydrofuran and/or polycaprolactone.

A further advantage is if the binders used in accordance with the invention are liquid at room temperature or have softening ranges according to DIN 53180 of below 130° C., preferably below 90° C., particularly preferably below 40° C., with a viscosity of below 100,000 mPas at 100° C., preferably below 30,000 mPas at 75° C., particularly preferably below 5,000 mPas at 50° C., while at the same time being viscosity-stable for at least 24 hours and at a temperature at which they have a viscosity of not more than 10,000 mPas, preferably not more than 2,000 mPas.

A further embodiment of the invention is that in which the binders can comprise esterification products of the substances of the formulae (V) and (VI) with monofunctional, imido-containing alcohols or acids according to DE-A-15 70 273 and/or polyfunctional, imido-containing alcohols or acids and/or imido-containing hydroxy acids according to DE-A-17 20 323.

In order to reduce the viscosity the binders can be heated on application or, in the case of solids, melted.

The binders can additionally comprise, moreover, known unsaturated reactive diluents, if appropriate in minor amounts.

The binders used in accordance with the present invention are advantageously suited to producing pigmented, unpigmented, colored or uncolored coating materials and coatings on metals and nonmetals with the additional use of the generally known auxiliaries such as adhesion promoters, catalysts, gloss enhancers and/or flow improvers.

The coatings are air-drying, heat- and/or radiation-curable and suitable for the construction of high-grade coatings. In all cases, curing is effected without emissions.

Suitable binders according to the present invention, therefore, are specific saturated and unsaturated polyester resins having dihydrodicyclopentadiene structural units and which can be cured without the use of monomers containing vinylic unsaturation both using high-energy radiation, preferably UV light, and using free radicals at room temperature, with known combinations of peroxides and co-initiators, such as heavy metal salts, and also thermally, using free-radical initiators such as peroxides, azo initiators or C-C-labile compounds, and also purely by means of heat. Any combination of said methods can also be used for curing. For instance, coatings can first of all be cured on the surface with UV light and can then be cured with heating using substances which under the action of heat produce free radicals. Furthermore, they can be cured partially by one of the methods mentioned and can then be fully cured later with the same method or a different method. Furthermore, they can also advantageously be partially cured using one of the methods mentioned, for example to provide stackability, and the final service properties can then be obtained by post-curing with the same method or a different method.

In this way, from the possibility of solvent-free application and of emission-free crosslinking, binder systems are provided which are extremely low in terms of emission on both application and curing. A further advantage of the binders used in accordance with the present invention is the possibility of curing them with high-energy radiation, preferably UV light, and by a free-radical method at room temperature, using known combinations of peroxides and co-initiators, for example heavy metal salts, and by means of heat, using heat-activated free-radical initiators such as peroxides, azo initiators or C-C-labile compounds, and also purely by heat, by means of stoving. Said methods can also be used in any desired combinations for curing. Preference is given to combined curing with thermally generated free radicals and UV-generated free radicals. Also possible is curing to a B stage, ie. a partially cured stage, at which curing is interrupted and can be started again at a later point in time. A particular advantage of the invention is that the coatings can be applied without solvents or volatile reactive diluents, the substances either being so liquid at room temperature that they can be processed or being liquefied by heating, said substances possessing good stability in both cases, in the presence or absence of curing catalysts, and thereby making it possible for processing and crosslinking to be carried out in a substantially emission-free manner.

It is very easy to obtain the adducts of maleic anhydride and water with DCPD, of the formulae (V) and (VI), which can be used additionally in the synthesis of the binders when the unsaturated polyesters are used in accordance with the invention.

Dihydrodicyclopentadienol of the formula (VII) is commercially available and can be used for the synthesis of the polyesters, by means of which the structures according to formulae (I) and (II) are likewise introduced, and saturated binders with novel structural units are obtained.

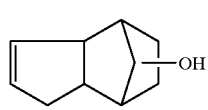

(VII)

The novel binders are synthesized in accordance with the known prior art for the preparation of polyesters, generally by polycondensation of polyfunctional hydroxy compounds with polyfunctional acids and/or their anhydrides at elevated temperatures. Furthermore, it is often advantageous to start from the esters of such substances and to generate the polyesters by transesterification at elevated temperatures, since transesterification reactions of this kind are in some cases easier and proceed more rapidly than direct esterification. Furthermore, by using polyfunctional amines it is also possible to obtain binders with amide structures. The use of monofunctional staring materials is also possible, in order for example to regulate the molecular weight. The starting materials listed below are not intended to restrict the invention to them, but merely serve as examples for illustration.

Suitable starting materials are di-, tri- and tetracarboxylic acids, such as adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid, pyromellitic acid, diols, such as ethylene glycol, polyethylene glycols, propylene glycol, polypropylene glycols, butanediol isomers, hexanediol, neopentylglycol, triols, such as trimethylolpropane, and glycerol, and also pentaerythritol, bisphenol A, hydrogenated bisphenol A, OH-polyfunctional polymers, such as hydroxyl-modified polybutadienes or hydroxyl-carrying polyurethane prepolymers and epoxy resins, polyfunctional natural substances or derivatives thereof, such as linseed oil fatty acid, dimeric and polymeric linseed oil fatty acid, castor oil and/or castor oil fatty acid. Also of importance are alkoxylated, OH-functional substances, for example the ethoxylation and propoxylation products of the above-mentioned polyols.

The introduction of amide and imide structures is also part of the known prior art in accordance with DE-A-15 70 273 and DE-A-17 20 323. The ability of such polyesteramides or polyesterimides to meet particular requirements, for example with regard to heat stability, is frequently better than that of pure polyester binders.

The structures of the formulae (I) and (II) can preferably be introduced by using, in the course of polycondensation, ester according to the formulae (V) and (VI).

Oligo-DCPD mixtures are obtained in a known manner by polycycloaddition of cyclopentadiene under superatmospheric pressure at between 170 and 300° C. These mixtures can be worked up by distillation, but are preferably reacted directly with, for example, maleic anhydride and water to give substances of the formulae (V) and (VI).

It is additionally possible to prepare binders with an excess of acid and then to react the free carboxyl groups with DCPD. A high conversion in this reaction requires the use of catalysts such as, for example, boron trifluoride etherate. This reaction, at elevated temperatures and superatmospheric pressure, also gives rise to the formation of oligo-DCPD structures. Where the polyesters in this reaction contain double bonds in the polymer chain, for example as maleic esters or fumaric esters, grafting with cyclopentadiene produces endomethylenetetrahydrophthalic acid structures of the formula (VIII).

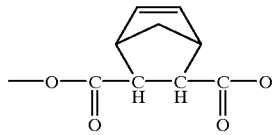

(VIII)

The synthesis of the binders in the context of the present invention, with specific requirements with regard, for example, to hardness, elasticity, viscosity and softening point, takes place in accordance with rules which are familiar to the person skilled in the art. For example, it is known to the person skilled in the art to vary the elasticity of cured polyester resins via the chain length of the polyols or polycarboxylic acids; for example, polyester resins synthesized using hexanediol or adipic acid are more flexible than those based on phthalic acid and ethylene glycol. Also known to the person skilled in the art is the ability to control the properties by using polyfunctional substances which produce branching in the polyester molecules, such as trimellitic acid or trimethylolpropane.

Since the groups of the formulae (I) and (II) essentially determine the reactivity and are generally terminal groups, when high molecular weight polyesters are synthesized the reactivity becomes progressively lower. An increase in the reactivity by the incorporation of further groups of the formulae (I) and (II) is possible, for example by the use of polyfunctional OH compounds and esterification with substances of the formulae (V) and (VI), but frequently leads to products of unsuitably high viscosity. A particular aspect of the present invention is therefore the use of DCPD-polyfunctional compounds. These substances carry a plurality of the reactive groups of the formulae (I) and/or (II) or contain these groups in high molar concentrations, for example in the case of monoesters of lower alcohols or diols. They are therefore highly reactive crosslinking agents which in many cases can be used alone for coating but which are preferably present proportionally in customary linear polyester resins or polyester resins with low degrees of branching. Furthermore, many of these substances are liquids of low viscosity and a very high boiling point, and can also be used to establish the viscosity ranges without causing higher emissions on processing and curing.

For instance, it is possible to use polyesters of relatively high melt viscosity and high softening point for the present invention and to establish the desired low processing viscosity by addition of these substances. These substances therefore represent reactive diluents which are tailored to the novel systems, and are free from the disadvantages of the known monomeric reactive diluents containing acrylic or vinylic unsaturation, such as styrene or monomeric acrylates.

Substances of this kind are derived from monofunctional alcohols or polyfunctional hydroxy compounds having more than two hydroxyl groups per molecule, which are esterified in part or in whole with monocarboxylic acids of the formulae (V) and (VI), but can also be partially esterified or etherified with other substances. Examples of substances of this kind are the esters of substances of the formulae (V) and (VI) with mono- and polyalcohols such as butanol, hexanol, butanediol, hexanediol, polyethylene glycol monoalkyl ethers, polypropylene glycol monoalkyl ethers, trimethylolpropane, pentaerythritol, or hydroxy compounds of even higher functionality. Also of importance in this respect are hydroxyl-containing natural oils such as castor oil, for example.

Also of particular importance are the esters of the ethoxylation and propoxylation products of such polyfunctional hydroxy compounds, and also polyesterpolyols and polyetherpolyols of the polyethylene oxide, polypropylene oxide, polytetrahydrofuran and polycaprolactone type; these esters are predominantly liquids of low viscosity. Other compounds of importance are the esters of polyurethanepolyols.

By way of the type of alkoxylating agent and degree of alkoxylation it is also possible to control properties of the cured films such as hardness, abrasion resistance, elasticity, adhesion, lubricity, etc. Such polyols can also be esterified only partially with substances of the formulae (V) and (VI), it being possible alternatively to leave the residual hydroxyl groups free or to esterify or etherify them with other substances or to react them with other substances which react with hydroxyl groups. Examples of substances suitable for this purpose are isocyanates or epoxides. An important advantage of the present invention is the establishment of the temperature-dependent viscosity of the coating compositions during processing by the use of these substances. By this means, and by means of the specific reactivity of the DCPD structures of the polyesters, it becomes possible to provide binders which are catalyzed ready for reaction, and which can either be processed in liquid form even at room temperature without the use of the known monomeric reactive diluents, such as styrene, vinyltoluene, a-methylstyrene, allyl esters and (meth)acrylic esters, or can be adjusted by heating to the viscosity which is appropriate to the particular application.

Substance mixtures which meet this requirement are resins which are solid or liquid at room temperature and have softening ranges according to DIN 53180 of below 130° C., preferably below 90° C., particularly preferably below 40° C., with a viscosity of below 100,000 mPas at 100° C., preferably below 30,000 mPas at 75° C., particularly preferably below 5000 mPas at 50° C. and below 10,000 mPas at 25° C., while being viscosity-stable for at least 24 hours at a temperature at which they have a viscosity of not more than 10,000 mnPas, preferably not more than 2000 mPas.

Preferably, these reactivity and viscosity regulators are prepared separately and then mixed with the novel polyesters and made up with or without catalysts, colorants, pigments, fillers and other auxiliaries to form ready-to-use, storage-stable coating compositions. In many cases, however, it is also possible to prepare such reactivity and viscosity regulators in situ during the polyester preparation, by appropriately adjusting the stoichiometric ratios.

Furthermore, it is technically possible to employ, in minor amounts, the known ethylenically unsaturated reactive diluents, for example styrene. Thus, for example, low-styrene coating compositions can be formulated while retaining the other good properties of the novel substances in order, for example, not to exceed statutory limits on the concentration or emission of styrene.

The binders to be used in accordance with the invention are air-drying at room temperature or elevated temperatures. They can be cured by stoving. This thermal curing can be accelerated, or carried out at lower temperatures, by the addition of substances which form free radicals on heating. Examples of known free radical initiators are peroxides, azo compounds, azides and C-C-labile substances. A considerable acceleration of curing or reduction in curing temperature can be achieved with metal co-initiators such as, for example, compounds of cobalt, manganese, iron, nickel, titanium or lead.

Furthermore, in the presence of UV initiators of the α-cleaving type (Norrish type I) or of the H-donor/acceptor system type (Norrish type II), the novel binders have a high UV sensitivity. A preferred mode of introduction of H-acceptor groups comprises the additional use of phenone compounds which can be incorporated by condensation, for example hydroxy- or bishydroxy-benzophenone or benzophenonetetracarboxylic acid, in the course of the polycondensation of the polyester resins.

The binders to be used in accordance with the present invention are employed in the preparation of pigmented or unpigmented coating materials and other coatings. In this context it is possible to use the techniques and substances which are customary in paint technology. The use is known of dyes, color pigments, mineral and nonmineral fillers, wetting agents and dispersants, adhesion promoters, flow assistants, and so on.

The coating materials prepared from the novel binders can be applied to a very wide variety of flat and textured substrates, such as pretreated and nonpretreated metal panels, metal articles or profiles, and to substrates comprising glass, ceramic, wood, woodchip products, plastics, fiber substrates comprising natural organic and inorganic fibers, those comprising synthetic organic and inorganic fibers, and many others. It is in this context that the particular technical feature of curability by a variety of methods comes into play, permitting the use of that curing technique which is optimum for the particular substrate and production process.

The parts and percentages in the following examples are by weight unless specified otherwise.

EXAMPLE 1

| | |
|---|---|
| 1586.52 g | of dicyclopentadiene (12.0 mol) and |
| 1176.72 g | of maleic anhydride (12.0 mol) | were weighed into a stirred flask equipped with beating and reflux condenser.

The mixture was heated to 125° C. under a gentle stream of nitrogen, and then 226.00 g of water (12.0 mol+10 g) were added via a dropping funnel over the course of one hour. Reaction was allowed to continue for one hour at 125° C. to form a monocarboxylic acid of the formula (V).

The contents of the flask were cooled to 70° C., and then

| | |
|---|---|
| 715.00 g | of 1,6-hexanediol (6.05 mol) |
| 4.00 g | of dibutyltin dilaurate (DBTL) and |
| 0.50 g | of hydroquinone | were added. The mixture was heated rapidly to 120° C. under a gentle stream of nitrogen and then raised gradually to 190° C. over the course of 6 hours, and the water of condensation formed was removed by distillation.

A soft resin was obtained with an acid number of 24 and viscosities of 4650 mPas at 50° C., 1460 mPas at 75° C. and 260 mPas at 100° C.

EXAMPLE 2

| 661.10 g | of dicyclopentadiene (5.0 mol) and |
|---|---|
| 490.30 g | of maleic anhydride (5.0 mol) | were weighed into a stirred flask equipped with heating and reflux condenser.

The mixture was heated to 125° C. under a gentle stream of nitrogen, and then 95.00 g of water (5.0 mol+5 g) were added via a dropping funnel over the course of one hour. Reaction was allowed to continue for one hour at 125° C. to form a monocarboxylic acid of the formula (V).

The contents of the flask were cooled to 70° C., and then

| 245.15 g | of maleic anhydride (2.5 mol) |
|---|---|
| 234.20 g | of neopentylglycol (2.25 mol) |
| 413.20 g | of 1,6-hexanediol (3.5 mol) |
| 4.00 g | of dibutyltin dilaurate (DBTL) and |
| 0.50 g | of hydroquinone | were added. The mixture was heated rapidly to 120° C. under a gentle stream of nitrogen and then raised gradually to 190° C. over the course of 3 hours, and the water of condensation formed was removed by distillation. After 2 hours more, the condensation was terminated to give a relatively low viscosity resin having free carboxyl and hydroxyl groups. The resulting liquid resin had an acid number of 53 and a viscosity of 6345 mPas at 25° C.

EXAMPLE 3

| 661.10 g | of dicyclopentadiene (5.0 mol) and |
|---|---|
| 490.30 g | of maleic anhydride (5.0 mol) | were weighed into a stirred flask equipped with heating and reflux condenser.

The mixture was heated to 125° C. under a gentle stream of nitrogen, and then 95.00 g of water (5.0 mol+5 g) were added via a dropping funnel over the course of one hour. Reaction was then allowed to continue for one hour at 125° C. to form a monocarboxylic acid of the formula (V).

The contents of the flask were cooled to 70 ° C., and then 532.20 g of TP 30 (6 mol-equivalents of OH) (TP 30 is an ethoxylation product of one mol of trimethylolpropane and about 3 mol of ethylene oxide, with an OH equivalent of 88.7) 3.00 g of dibutyltin dilaurate (DBTL) and 0.30 g of hydroquinone were added.

Esterification was carried out at up to an acid number of 8 by slow heating to 190° C. under a gentle stream of nitrogen. The resulting resin had a high viscosity at room temperature. The temperature-dependent viscosities were 1650 mPas at 50° C. and 380 mPas at 100° C.

EXAMPLE 4

| 1332.10 g | of dicyclopentadiene (10.0 mol) and |
|---|---|
| 980.60 g | of maleic anhydride (10.0 mol) | were weighed into a stirred flask equipped with heating and reflux condenser. The mixture was heated to 125° C. under a gentle stream of nitrogen, and then 190.00 g of water (10.0 mol+10 g) were added via a dropping funnel over the course of one hour. Reaction was allowed to continue for one hour at 125° C. to form a monocarboxylic acid of the formula (V).

The contents of the flask were cooled to 70° C., and then

| 963.60 g | of n-butanol (13 mol), |
|---|---|
| 0.30 g | of hydroquinone and |
| 8.00 g | of p-toluenesulfonic acid | were added.

The reflux condenser was replaced by a water separator. Under nitrogen, the contents of the flask were brought to boiling and water was separated off, during which the boiling temperature rose continuously. From an internal flask temperature of 170° C., the water separator was switched over to distillation and the temperature was raised to 190° C. over the course of 2 hours, during which the excess butanol distilled off. After cooling, a liquid of low viscosity was obtained which had an acid number of 18.1 and a viscosity of 252 mPas at 25° C.

Performance Testing of Coatings According to the Invention a) Coil coating paint

| 275 parts | of resin according to Example 1 |
|---|---|
| 100 parts | of resin according to Example 2 |
| 125 parts | of the compound according to Example 4 |
| 145 parts | of rutile pigment Kronos) 2300 and |
| 5 parts | of color black | were heated to 40° C., homogenized in a laboratory dissolver and then dispersed on a triple roll mill to give a paint with a viscosity of 3250 mPas at 25° C. The paint was applied with a doctor blade of gap height of 60 μ to degreased steel panels 0.5 mm thick, which were then stoved in a convection oven at 180° C. for 5 minutes, leading to a weight loss of 2.4%. The resulting paint film was light gray in color, hard and scratch-resistant, possesses flexural strength and shows no sign of attack after rubbing ten times with an acetone-soaked cottonwool pad.

b) Circuit board coating

| 275 parts | of resin according to Example 2 |
|---|---|
| 100 parts | of resin according to Example 3 |
| 125 parts | of compound according to Example 4 |
| 15 parts | of tert-butyl perbenzoate and |
| 15 parts | of benzophenone | were mixed with gentle heating and the mixture was applied with a brush to the solder contact side of a circuit board fitted with electrical elements. The board was heated in a convection oven at 80° C. for 10 minutes, during which the resin gelled but remained still tacky on the surface. The still hot board was irradiated immediately for 60 seconds, using a broadband UV lamp, with an energy of 45 mW/cm². With this treatment, the resin hardened (cured) to form a clear, scratch-resistant coating which showed no swelling after 15 minutes treatment with an acetone-soaked cottonwool pad. The covering of the solder points with resin is very good. The emission losses in the course of curing are 1.79% by weight.

We claim:
1. A low-emission coating composition, comprising:

as a binder, a mixture of saturated and unsaturated polyester resins comprising structural units of the formulae (I) and/or (II)

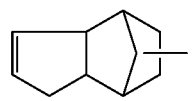
(I)

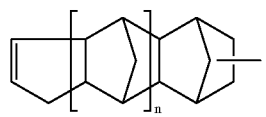
(II)

n = 1 to 10 which have been introduced into the resin by using compounds of the formulae (V) and/or (VI)

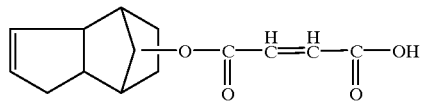
(V)

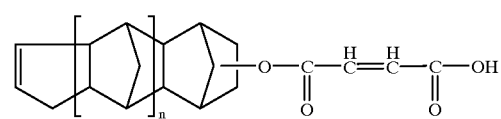
(VI)

n = 1 to 10 the binder of the composition and the composition not containing a copolymerizable monomeric reactive diluent.

2. The composition as claimed in claim 1, wherein the structural units of the formulae (I) and/or (II) are incorporated into the resin in the form of esters of dihydrodicyclopentadienol with monomeric or polymeric carboxylic acids comprising groups of the formula (III) and/or in the form of esters of oligodihydrodicyclopentadienol with monomeric or polymer carboxylic acids comprising groups of the formula (IV)

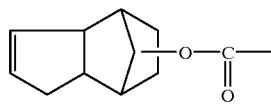
(III)

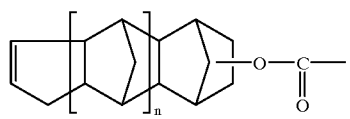
(IV)

n = 1 to 10.

3. The composition as claimed in claim 1, wherein the polyesters are synthesized by reacting ethoxylated or propoxylated alcohols or polyols, mono- or polyhydric alcohols of polyesterpolyols or mono- or polyhydric alcohols of a polyetherpolyol, polycaprolactone or polytetrahydrofuran.

4. The composition as claimed in claim 1, wherein ethylenically unsaturated units are present in the synthesis of the polyester resins.

5. The composition as claimed in claim 1, wherein the binders comprise chemically bonded photoinitiators containing xanthone, thioxanthone and/or phenone structures, or wherein hydroxybenzophenone or benzophenonetetracarboxylic acid are incorporated into the polyesters by condensation as chemically bonded photoinitiator.

6. The composition as claimed in claim 1, wherein the coatings are cured by stoving at a temperature of 80 to 3000° C.

7. The composition as claimed in claim 1, wherein the binders are cured with peroxides, with or without reaction-accelerating co-initiators, at room temperature or at elevated temperature, up to a partially cured B stage, and is then cured fully at a later point in time.

8. The composition as claimed in claim 1, wherein the binders are cured with actinic radiation with a photoinitiator present in either chemically bonded form in the binder or having been added to the binder, or both chemically bonded and added photoinitiators are used, and, wherein curing with actinic radiation is combined with curing with peroxides or C-C-labile substances or purely thermal curing.

9. The composition as claimed in claim 1, wherein the binders comprise esterification products of the formulae (V) and (VI) with monofunctional alcohols and/or polyfunctional alcohols and/or the alkoxylation products thereof and/or polyetherpolyols and/or polyesterpolyols and/or esterification products of the substances of the formula (V) and (VI) with monofunctional, imido-containing alcohols or acids and/or polyfunctional, imido-containing alcohols or acids and/or imido-containing hydroxy acids.

10. The composition as claimed in claim 1, wherein the binders are liquid at room temperature or have a softening temperature according to DIN 53810 below 130° C., with a viscosity of below 100,000 mPasn at 100° C., while being viscosity-stable for at least 24 hours at a temperature at which they have a viscosity of not more than 10,000 mPas, or wherein the binders are heated on application in order to reduce the viscosity or, in the case of solids, are melted.

11. A pigmented, unpigmented, colored or uncolored coating composition, comprising:
a binder as claimed in claim 1 in combination with the customary auxiliaries selected from the group consisting of adhesion promoters, catalysts, gloss enhancers, flow improvers and combinations thereof and optionally a pigment or coloring agent.

12. The coating composition of claim 11, wherein the coating composition coats metals and non-metals.

* * * * *